United States Patent [19]

Amendola et al.

[11] Patent Number: 5,192,262

[45] Date of Patent: Mar. 9, 1993

[54] CONTAINER WRAPPERS WITH INTEGRAL TEAR TAPE, AND METHODS AND APPARATUS FOR MAKING SAME

[75] Inventors: Angel Amendola, Millersville, Md.; Xuan M. Pham, Richmond, Va.

[73] Assignee: Philip Morris Incorporated, New York, N.Y.

[21] Appl. No.: 782,917

[22] Filed: Oct. 25, 1991

Related U.S. Application Data

[60] Continuation of Ser. No. 508,227, Apr. 12, 1990, abandoned, which is a division of Ser. No. 342,240, Apr. 24, 1989, Pat. No. 4,938,363.

[51] Int. Cl.⁵ ............................................... B31B 1/25
[52] U.S. Cl. ..................................... 493/365; 493/364; 493/930; 493/963; 53/412
[58] Field of Search ............... 493/355, 362, 364, 365, 493/930, 963; 53/412

[56] References Cited

U.S. PATENT DOCUMENTS

| | | |
|---|---|---|
| 1,589,603 | 6/1926 | Lee . |
| 2,344,559 | 3/1944 | Newman . |
| 2,579,443 | 12/1951 | Snyder . |
| 2,592,734 | 4/1952 | Pike . |
| 2,963,213 | 12/1960 | Nauman . |
| 3,080,238 | 3/1963 | Kraft et al. . |
| 3,260,405 | 7/1966 | Frischer et al. . |
| 3,343,747 | 9/1967 | Molins . |
| 3,379,364 | 4/1968 | Pilger . |
| 3,379,814 | 4/1968 | Bracey . |
| 3,387,736 | 6/1968 | Williamson . |
| 3,403,840 | 10/1968 | Mathes ................................ 53/412 |
| 3,409,206 | 11/1968 | Slouka et al. ...................... 493/963 |
| 3,456,780 | 7/1969 | Forman . |
| 3,494,538 | 2/1970 | Matthews . |
| 3,498,448 | 3/1970 | Kuster . |
| 3,502,257 | 3/1970 | Virros . |
| 3,641,732 | 2/1972 | Fujio . |
| 4,947,994 | 8/1990 | Newsome ........................ 206/264 X |

FOREIGN PATENT DOCUMENTS

| | | |
|---|---|---|
| 1761839 | 9/1971 | Fed. Rep. of Germany . |
| 2652079 | 5/1978 | Fed. Rep. of Germany . |
| 2730025 | 1/1979 | Fed. Rep. of Germany . |
| 3821266 | 1/1989 | Fed. Rep. of Germany . |
| 2127136 | 10/1972 | France . |
| 2303720 | 10/1976 | France . |
| 1514174 | 6/1978 | United Kingdom . |
| 2031385 | 4/1980 | United Kingdom . |

*Primary Examiner*—Bruce M. Kisliuk
*Assistant Examiner*—John A. Marlott
*Attorney, Agent, or Firm*—Charles B. Smith; Karen G. Horowitz

[57] ABSTRACT

An outer wrapper for a container which includes an integral tear tape. The tear tape is formed by cutting two sets of score lines extending partially through the thickness of the wrapper material. The tear tape can be patterned to conform to the parting line along which the container opens, including oblique segments, thus allowing the container to be opened without interference from the parts of the wrapper which remain in contact with the container subsequent to removal of the tear tape.

16 Claims, 4 Drawing Sheets

CONTAINER WRAPPERS WITH INTEGRAL TEAR TAPE, AND METHODS AND APPARATUS FOR MAKING SAME

This is a continuation of application Ser. No. 07/508,227, now abandoned, filed Apr. 12, 1990, entitled CONTAINER WRAPPER WITH INTEGRAL TEAR TAPE, AND METHODS AND APPARATUS FOR MAKING SAME, which is a division of application Ser. No. 07/342,240, filed Apr. 24, 1989 now U.S. Pat. No. 4,938,363.

BACKGROUND OF THE INVENTION

This invention relates to an overwrap for sealing a container, and more particularly to container wrappers having an integral tear strip designed for sealing, for example, a "flip-top" cigarette box. The invention also relates to methods and apparatus for making such wrapper and forming the integral tear strips.

Overwraps for various packages such as cigarette boxes are well known and have been used for many years to seal and maintain the integrity and freshness of the packaged contents prior to opening. It is customary to wrap the cigarette box in an outer wrapper, which is usually made of polypropylene film. A tear tape is usually provided to facilitate removal of the outer wrapper. The tear tape is a separate strip of material bound to the inner surface of the overwrap, with a portion of the strip extending outside the wrapper to facilitate opening of the wrapper. The tear tape typically consists of a material of greater strength than the overwrap such that the overwrap tears when the tear tape is pulled from around the container, allowing the tear tape and overwrap to be removed from the box.

The use of a separate tear tape requires a process for binding the tear tape to the wrapper. This type of tear tape results in the additional cost of the second material. Additionally, prior art tear tapes could become separated from the wrapper, leaving the consumer frustrated, without any easy means of removing the outer wrapper from the box.

One popular type of container for cigarettes is the so-called "flip-top" box. A flip-top box typically has a lid which is hinged at the back side of the cigarette box. The lid of the box is cut such that the cut across the front wall of the box lid extends below the hinged portion across the back wall of the box, and the cuts in the side walls of the box are inclined upwards from the cut across the front wall to the hinge on the back wall. Tear tapes not following the shape of the cut would either require removal of at least one portion of the overwrap, resulting in lost freshness and reduced protection of the box's contents, or would cause the over-wrap to interfere with the operation of the flip-top box's hinge.

It is, therefore, an object of this invention to provide improved outer wrappers for containers, with integral tear tapes.

It is another object of this invention to provide outer wrappers having integral tear tapes which conform to the parting line between the parts of the container to which the outer wrapper is attached.

SUMMARY OF THE INVENTION

In accordance with the present invention, an outer wrapper is provided from a single sheet of material having an integral tear tape, preferably cut in a pattern to conform to the parting line between the separable portions of the container. The integral tear tapes are formed by scoring a plurality of lines partially through the thickness of the web material. In a preferred embodiment, one set of score lines are cut in a first side of the web and a second set of score lines are cut in the second side of the web. The use of integral tear tapes advantageously eliminates the manufacturing steps of bonding a separate tear tape to the inside of the wrapper, and eliminates the need for the additional materials, such as the separate tear tape member and bonding agents.

Another aspect of the present invention relates to the methods and apparatus for making such outer wrappers. In the preferred embodiment, a continuous sheet of web material is drawn from a roll into a set of knife drums. These drums score the web to form the integral tear tape. The web passes through another set of rollers which cut the web into separate outer wrappers. These rollers also cut the web so as to form a tab for pulling the tear tape. Adhesive may be applied to the wrappers, either prior to or after cutting the web into separate wrappers. The adhesive, which may be thermally activated, is used to keep the wrapper attached to the container after the tear tape has been removed.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
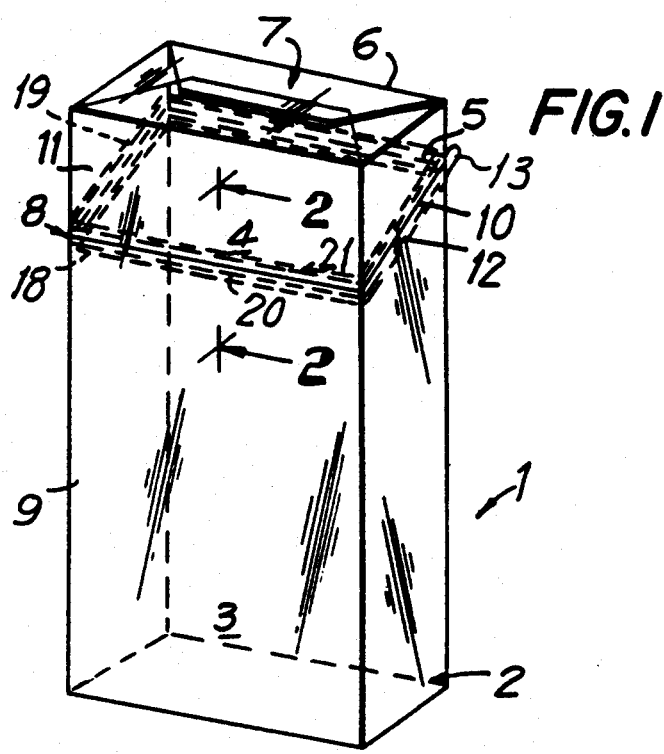
FIG. 1 is an elevated perspective view of a container wrapper in accordance with an embodiment of the present invention.

FIG. 1 shows a conventional "flip-top" cigarette box 1, sealed with an outer wrapper 2 in accordance with the present invention. Box 1 consists of a bottom portion 3 and a lid 4, the two portions being connected by a hinge 5 on the rear wall 6. Lid 4 is cut such that the distance between hinge 5 and top wall 7 is substantially smaller than the distance between cut 8 and wall 7. Cut 8 separates lid 4 and bottom portion 3 on front wall 9, and is connected to hinge 5 by upwardly inclined cuts 10 and 11.

Outer wrapper 2, which completely encloses box 1, is generally made of polypropylene film. A tear tape 12 is provided as a means for separating outer wrapper 2 along the separable portions of the container. Tear tape 12 is an integral tear tape formed by scoring wrapper 2. The score lines are cut in a pattern such that they extend annularly around the exterior of the box, following the path of cuts 8, 10, and 11, and hinge 5 of the container. A small tab 13 of tear tape 12 is provided to project from the box to enable the consumer to easily grasp and pull the tear tape from the box. Tear tape 12 separates the wrapper along the inside set of score lines (lines 20 and 21 of FIG. 2). The tear tape may be completely removed from the box, allowing the flip-top of the box to be easily opened, without interference from the remaining portions of the wrapper. Optionally, the two, newly-separated portions of the wrapper remain attached to the box by means of adhesive, such as pressure sensitive or heat sensitive glue, applied to the wrapper in areas to be secured to the appropriate container panels. Because the wrapper remains attached to the upper and lower portions of the box, the contents of the box maintain their freshness longer and are better protected from moisture than if the wrapper were removed.

In the preferred embodiment, tear tape 12 is formed by scoring the wrapper with four substantially parallel score lines. A first set of two score lines is cut in a first surface of wrapper 2. A second set of two score lines is cut in the other surface of wrapper 2.

Figure 2:
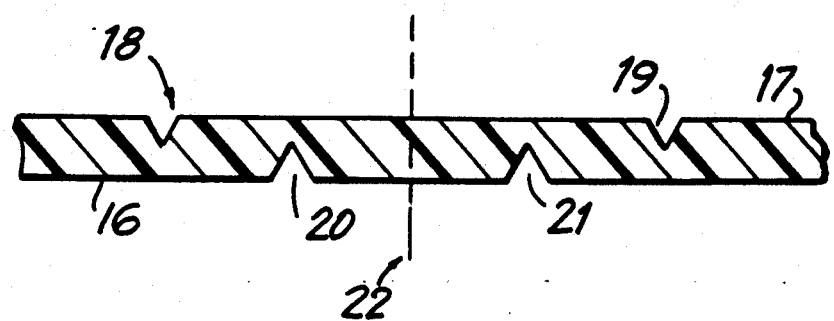
FIG. 2 is a cross-sectional view of a wrapper showing the two sets of cuts made to form the tear strip taken along line 2—2 of FIG. 1.

Referring to FIG. 2, the two sets of score lines or cuts are shown. Line 22 indicates the position of the hinge and cuts of the flip-top box relative to inner cuts 20 and 21 when wrapper 2 is properly positioned to enclose box 1. Inner cuts 20 and 21 are made on the interior of wrapper 2, i.e., the side proximate to the container. Cuts 20 and 21 are preferably centered about line 22. In the preferred embodiment, cuts 20 and 21 are separated by a distance of approximately three millimeters. These cuts are made to a depth of approximately 60 percent of the thickness of the wrapper. Outer cuts 18 and 19 are made in the portion of the wrapper exterior to the container. Outer cuts 18 and 19 also are preferably centered about line 22. Cut 18 is spaced apart from cut 20, and cut 19 is spaced apart from cut 21. Looking at FIG. 2, cuts 18 and 19 are said to "straddle" cuts 20 and 21. In the preferred embodiment, cuts 18 and 19 are separated by a distance of approximately five millimeters. These cuts are made to a depth of approximately 40 percent of the thickness of the wrapper. Conventional wrappers are made of polypropylene or cellophane materials and have thicknesses that range from about 0.0007 to about 0.0016 inches, preferably about 0.0013 inches.

Inner cuts 20 and 21 form the boundaries of tear tape 12 as force is applied by the consumer when opening the package. Extending 60 percent through wrapper 2, cuts 20 and 21 form a low resistance path for the tear in the wrapper to follow. The spaces between cuts 18 and 20, and between cuts 19 and 21 prevent the tear from "wandering" from the track, thereby preventing inadvertent tearing of or damage to the remaining portions of the wrapper. By forming cuts 18 and 19 in the exterior surface at a depth of approximately 40 percent of wrapper thickness, the likelihood of the tear tape separating from the remaining portions of the wrapper at cuts 18 and 19 is minimized.

In a preferred embodiment, a series of turns are formed where the sets of parallel score lines change direction to conform with the shape of the separable portions of the flip-top box. The score lines are preferably provided with a radius in the corners to prevent damage to wrapper 2 as the tear tape is removed from the box.

Figure 3:
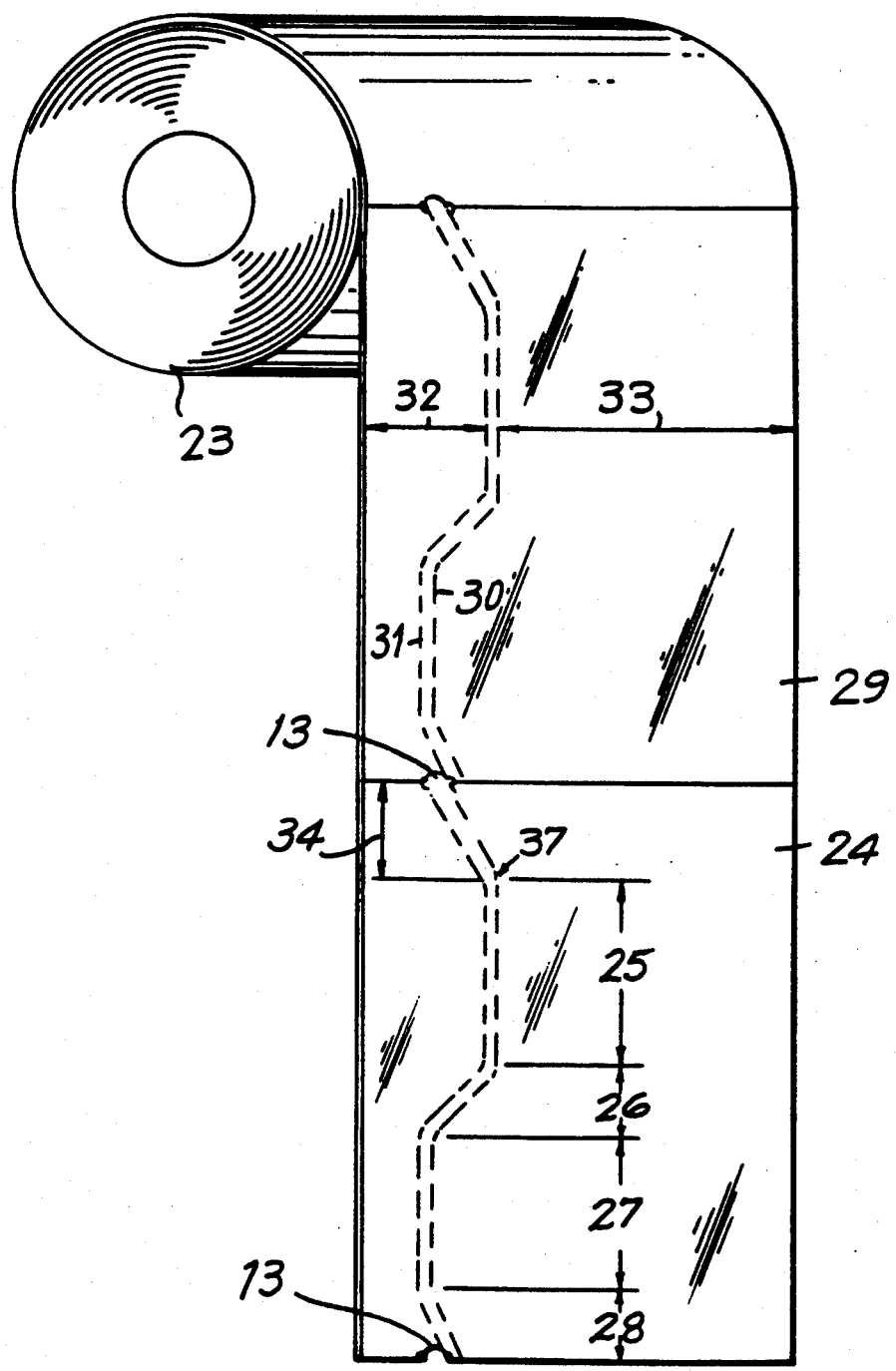
FIG. 3 is a perspective elevational view of a roll of web material in which two complete container wrappers have been cut in accordance with this invention.

FIG. 3 is a perspective elevational view of a wrapper in accordance with this invention before it is separated from the web and attached to a box. FIG. 3 shows two complete wrappers 24 and 29. As the roll of web material 23 is unwound, two sets of lines 30 and 31, are scored in the web. The pattern is preferably selected so that when assembled about the container to be wrapped, the tear tape formed by the cuts in the wrapper will substantially align with the cuts in the container. The tear tape is formed to the left of center of the web, along the longitudinal axis, because the bottom of the box to be wrapped is substantially larger than the top of the box. Hence, distance 33 is substantially greater than distance 32.

Comparing FIG. 3 with FIG. 1, segment 34 of the wrapper aligns with cut 10 of box 1. In segment 34, cut 30 is not parallel with cut 31. Cuts 30 and 31 become substantially parallel at corner 37 and remain as such across segments 25, 26, 27, and 28. Segment 25 aligns with front cut 8 of the box when the wrapper is applied. Segments 26, 27, and 28 align with box cut 11, hinge 5, and cut 10, respectively. Segment 34 overlaps segment 28. Segments 34, 25, 26, 27, and 28 are connected by a plurality of turns, such as corner 37. In the preferred embodiment, these turns are rounded to keep the tear tape on track as it is pulled.

Figure 4:
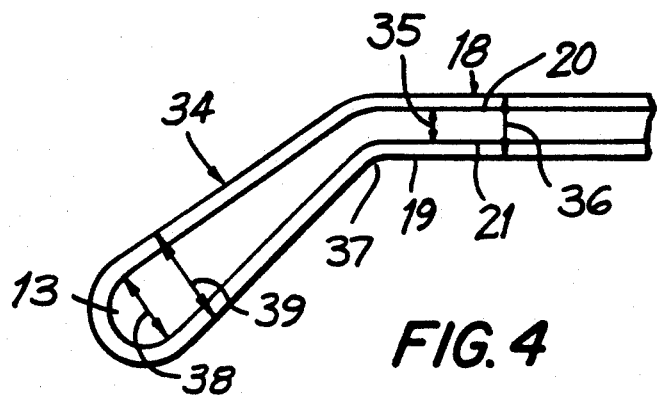
FIG. 4 is a detailed elevational view of the pull tab of a wrapper of FIG. 3.

A detailed elevational view of tab 13 and the first segment of wrapper 2 are shown in FIG. 4. Tab 13 is a "U" tab cut completely through the wrapper at an edge of the wrapper so that when wrapper 2 is affixed to the box, tab 13 protrudes from the box and can be conveniently grasped by the consumer. Tab 13 could be formed in a variety of shapes. The first segment 34 of the tear tape is designed with larger dimensions 28 and 39 tapering down to smaller dimensions 35 and 36 near the beginning of the second segment. The tear tape narrows continuously and synclinally throughout the length of segment 34, from tab 13 to the first corner 37 in the scored line pattern. When wrapper 2 is properly positioned around box 1, segment 34 overlays cut 10 of box 1. The function of segment 34 is to properly channel the initial force applied to tab 13 into the track created by score lines 20 and 21. The tapering dimension of segment 34 prevents excessive wander of the tear tape. In a preferred embodiment, tab 13 is printed or colored to enhance identification of the tab by the consumer. A cutout portion may be provided at the intersection of the tab and the edge of the wrapper to assist directing the pulling force into the appropriate score lines 20 and 21.

Figure 5:
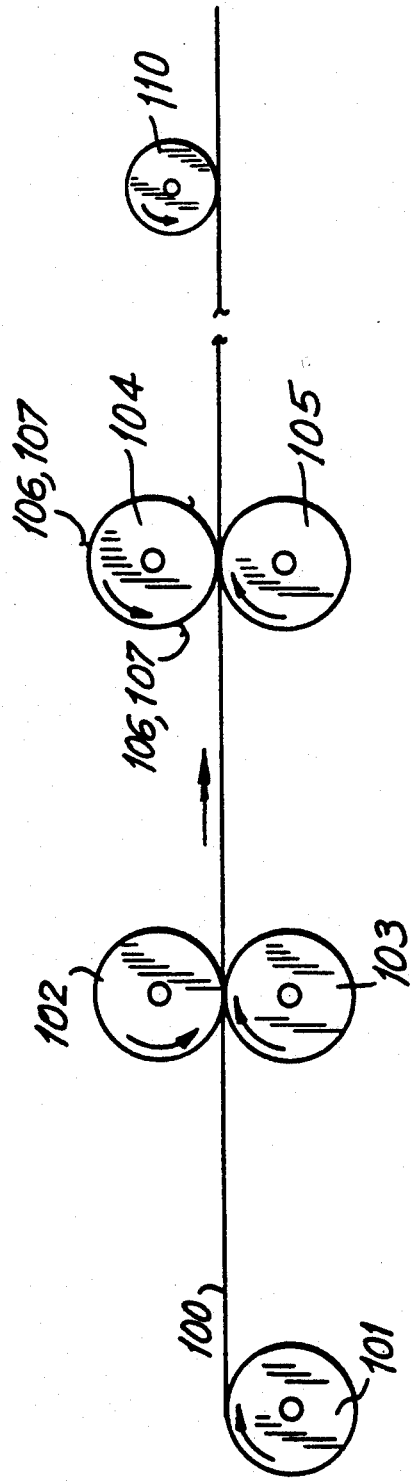
FIG. 5 is partly schematic, longitudinal sectional view of illustrative apparatus used to make container wrappers in accordance with this invention.
Figure 6:
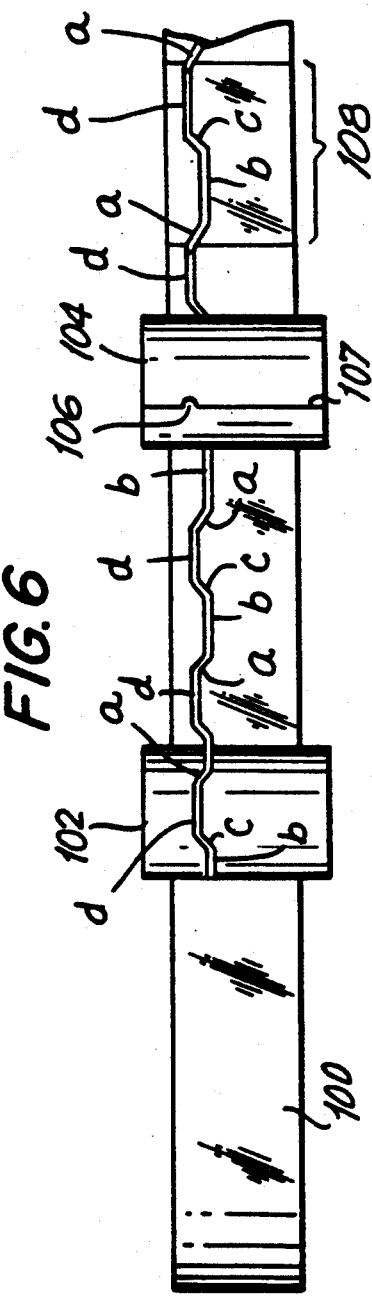
FIG. 6 is a top view of the apparatus of FIG. 5.
Figure 7:
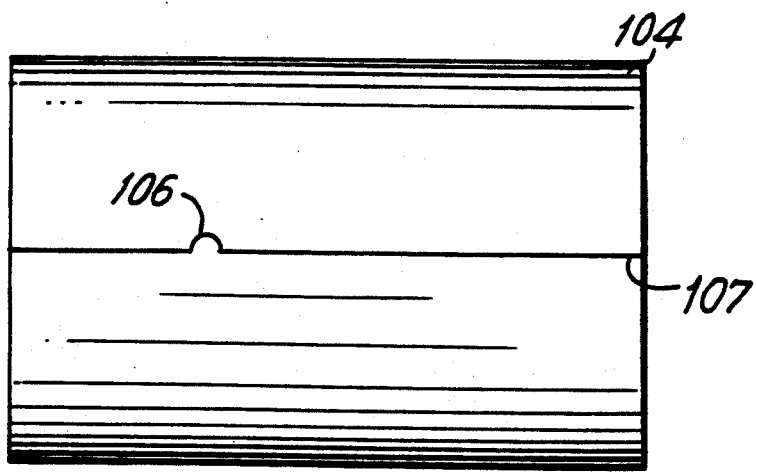
FIG. 7 is a top view of roller 104 of FIG. 6.

FIGS. 5 and 6 illustrate methods and apparatus suitable for making outer wrappers in accordance with the present invention. A continuous web 100 of wrapper material (e.g., conventional polypropylene film) is drawn from supply roll 101. Web 100 is drawn through rollers 102 and 103. Rollers 102 and 103 are knife drums which rotate in synchronism with supply roll 101 and cut a longitudinally repeating pattern of four longitudinal segments a, b, c, and d. Roller 102, disposed on one side of web 100, cuts two parallel lines for segments b, c, and d (see cuts 18 and 19 of FIG. 2) at a depth of approximately 40 percent of the thickness of web 100. Segment a is cut to the same depth, but the lines are not cut parallel to each other. These lines are cut to form the initial segment of the tear strip (shown in detail in FIG. 4).

Roller 103, disposed on the other side of web 100, also cuts two parallel lines for each of segments b, c, and d, these lines being spaced closer together than the lines cut by roller 102 (see cuts 20 and 21 of FIG. 2). Segment a cuts are made non-parallel so as to form the initial segment of the tear tape. Roller 103 cuts to a depth of approximately 60 percent of the thickness of web 100.

After exiting rollers 102 and 103, wrapper material 100, now etched on both sides with the tear tape pattern, is drawn through rollers 104 and 105. Roller 104 is a knife drum having several angularly spaced blades 107. As shown in FIG. 6, blades 107 extend across the width of roller 104. Roller 104 rotates in synchronism with anvil drum roller 105, cutting or perforating the entire width of web 100 at or near the transitions between segments a and d of the tear tape, to form individual wrappers 108 from web 100. Roller 104 is equipped with several U-shaped blades 106, one along each knife blade 107. Blade 106 notches web 100 to form tab 13 (see FIG. 3, in which tab 13 is shown formed by the notched cut of blade 106). After leaving rollers 104 and 105, web 100 has been cut into separate outer wrappers 108. If desired, adhesive may be applied to the wrapper with adhesive applying means 110.

Although the invention has been described in the illustrative context of outer wrappers for certain kinds of cigarette boxes, it will be understood that the invention has numerous other applications. For example, wrappers in accordance with this invention could be applied to any container having partially or completely separable components. The score lines forming the tear tape could follow any contour.

One skilled in the art will appreciate that the present invention can be practiced by other than the described embodiments, which are presented for purposes of illustration and not of limitation, and the present invention is limited only by the claims which follow.

We claim:

1. A method for making a wrapper having an integral tear tape for a container, comprising the steps of:
   feeding a web of material having a longitudinal axis, and first and second major surfaces on respective opposite sides of said web member;
   scoring a first set of substantially parallel score lines partially through the thickness of said first major surface to extend a first depth through the wrapper, said first set of score lines being spaced apart by a first predetermined distance;
   scoring a second set of substantially parallel score lines partially through the thickness of said second major surface to extend a second depth through the wrapper, said second set of score lines being spaced apart by a second predetermined distance, wherein said first depth is greater than said second depth and wherein said second predetermined distance between said second set of score lines is larger than said first predetermined distance between said first set of score lines, such that said second set of score lines straddles said first set of score lines to form an integral tear tape,
   wherein said first and second sets of score lines are scored in a longitudinally repeating pattern of first through fourth longitudinal segments, at least two of said segments being parallel to said longitudinal axis and connected to each other by a third segment that is transverse to said longitudinal axis, wherein the connections between said segments are rounded; and
   severing completely through said longitudinal web, perpendicular to the longitudinal axis, to form a wrapper;
   wherein said integral tear tape formed by said first and second sets of scored lines will not deviate from the path of said pattern.

2. The method of claim 1 further comprising the step of making a cut at the end of said tear tape for providing a tab for said tear tape.

3. The method of claim 2 wherein said cut forming said tab is U-shaped.

4. The method of claim 1 further comprising substantially centering said first and second set of score lines about a plane perpendicular to the plane of said web and parallel to the line of said score lines.

5. The method defined in claim 1 wherein said first segment is formed by cutting synclinally from a tab formed at one end to the rounded connection of said first segment to said second segment.

6. The method defined in claim 1 further comprising applying adhesive to the container wrapper.

7. Apparatus for forming a wrapper having an integral tear tape, said wrapper having first and second major surfaces, comprising:
   means for continually advancing wrapper material;
   first means for scoring a first set of substantially parallel score lines partially through the thickness of said first major surface of said wrapper to extend a first depth through the wrapper, said first set of score lines including at least two non-intersecting score lines spaced apart by a first predetermined distance;
   second means for scoring a second set of substantially parallel score lines partially through the thickness of said second major surface of the wrapper to extend a second depth through the wrapper, wherein said first depth is greater than said second depth, said second set of score lines including at least two non-intersecting score lines spaced apart by a second predetermined distance, said second predetermined distance being larger than said first predetermined distance, and said second set of score lines straddling said first set of score lines to form an integral tear tape, wherein said first and second scoring means comprise a longitudinally repeating pattern first through fourth longitudinal segments, at least two of said segments being parallel to said longitudinal axis and connected to each other by a third segment that is transverse to said longitudinal axis, wherein the connections between said segments are rounded; and
   means for cutting said scored wrapper material into individual wrappers;
   wherein said integral tear tape formed by said first and second sets of scored lines will not deviate from the path of said pattern.

8. The apparatus of claim 7 wherein said first means for scoring said material further comprises at least one scoring roller and said second means for scoring further comprises at least one scoring roller.

9. The apparatus of claim 7 further comprising means for cutting a tab in said wrapper material.

10. The apparatus of claim 7 further comprising means for applying adhesive to said wrapper material.

11. A method for making an integral tear tape in a wrapper for a container, said wrapper having a longitudinal axis, and first and second major surfaces on respective opposite sides of said wrapper, said method comprising the steps of:
    scoring a first set of substantially parallel score lines partially through the thickness of said first major surface to extend a first depth through said wrapper, said first set of score lines being spaced apart by a first predetermined distance to form an integral tear tape; and scoring a second set of substantially parallel score lines partially through the thickness of said second major surface to extend a second depth through said wrapper, said second set of score lines being spaced apart by a second predetermined distance, wherein:

said second predetermined distance is larger than said first predetermined distance such that said second set of score lines straddles said first set of score lines; and said first depth is substantially greater than said second depth such that said first set of score lines form the boundary of said integral tear tape and said second set of score lines form a low resistance path along which said tear tape is torn, said path minimizing the likelihood of said tear tape separating from the remaining portions of the wrapper beyond said boundary of said tear tape.

12. The method of claim 11 further comprising the step of substantially centering said first and second set of score lines about a plane perpendicular to the plane of said wrapper and parallel to the line of said score lines.

13. The method of claim 11 further including the step of scoring said first and second sets of score lines in a pattern of first through fourth longitudinal segments, at least two of said segments being parallel to said longitudinal axis and connected to each other by a third segment that is transverse to said longitudinal axis.

14. The method of claim 13 further including the step of scoring the connections between said segments such that said connections are rounded.

15. The method of claim 11 further including the step of making a cut at the end of said tear tape for providing a tab for said tear tape.

16. The method of claim 11 wherein:

said first set of score lines is scored to extend through more than half the thickness of said wrapper; and said second set of score lines is scored to extend through less than half the thickness of said wrapper.

* * * * *